(12) United States Patent
Huang et al.

(10) Patent No.: US 10,969,071 B1
(45) Date of Patent: Apr. 6, 2021

(54) COLOR PHOTOVOLTAIC PANEL DEVICE AND PHOTOVOLTAIC STREET LAMP

(71) Applicant: Hunan Nepuenergy Science & Technology Co., Ltd., Changsha (CN)

(72) Inventors: Haoyu Huang, Changsha (CN); Yibo Wang, Changsha (CN)

(73) Assignee: HUNAN NEPUENERGY SCIENCE & TECHNOLOGY CO., LTD., Changsha (CN)

( * ) Notice: Subject to any disclaimer, the term of this patent is extended or adjusted under 35 U.S.C. 154(b) by 0 days.

(21) Appl. No.: 16/879,033

(22) Filed: May 20, 2020

(30) Foreign Application Priority Data

Jan. 10, 2020 (CN) .......................... 202020048656.1

(51) Int. Cl.
| | | |
|---|---|---|
| *F21S 9/03* | (2006.01) | |
| *F21V 23/00* | (2015.01) | |
| *F21S 8/08* | (2006.01) | |
| *F21W 131/103* | (2006.01) | |

(52) U.S. Cl.
CPC ............... *F21S 9/035* (2013.01); *F21S 8/085* (2013.01); *F21V 23/003* (2013.01); *F21W 2131/103* (2013.01)

(58) Field of Classification Search
CPC .. F21S 9/035; F21S 8/085; F21S 9/037; F21S 9/03; F21V 23/003; F21V 23/007; F21V 23/008; F21W 2131/103; F21L 4/02; F21L 4/08

See application file for complete search history.

(56) References Cited

U.S. PATENT DOCUMENTS

| | | | |
|---|---|---|---|
| 2010/0302764 A1* | 12/2010 | Yu ........................... | F21V 29/83 362/183 |
| 2011/0018448 A1* | 1/2011 | Metchear, III .......... | F21S 9/035 315/152 |
| 2017/0028863 A1* | 2/2017 | Meringer ................ | H02S 20/20 |

* cited by examiner

*Primary Examiner* — Bao Q Truong
(74) *Attorney, Agent, or Firm* — Dorsey & Whitney LLP

(57) ABSTRACT

The device includes a photovoltaic panel, an illumination lamp, a control device and a lamp strap disposed on the photovoltaic panel; the photovoltaic panel is electrically connected to the control device, and when the photovoltaic panel senses light, the photovoltaic panel performs photoelectric conversion and generates a conversion electric signal, so as to output the conversion electric signal to the control device; the control device is electrically connected to the lamp strap, and when the voltage of the conversion electric signal is lower than a preset threshold, the control device generates a driving electric signal, so as to transmit the driving electric signal to the lamp strap; the control device is electrically connected to the illumination lamp, and the control device transmits an illumination signal to the illumination lamp for illumination; the lamp strap receives the driving electric signal, and emits light.

10 Claims, 5 Drawing Sheets

COLOR PHOTOVOLTAIC PANEL DEVICE AND PHOTOVOLTAIC STREET LAMP

CROSS-REFERENCE TO RELATED APPLICATION

This application claims the benefit of Chinese Patent Application No. 202020048656.1, filed on Jan. 10, 2020, the entire content of which is incorporated herein in its entirety.

TECHNICAL FIELD

The present disclosure relates to the technical field of photovoltaic street lamps, in particular to a color photovoltaic panel device and a photovoltaic street lamp.

BACKGROUND

With the continuous development of new energy technology, photovoltaic street lamps using solar energy for power generation have been continuously developed as a green energy-saving lighting technology. The photovoltaic street lamps receive light in the daytime through photovoltaic panels and convert solar energy into electric energy and store electric energy. The stored electric energy is released at night to provide power to the street lamp for illumination.

However, because of the lack of light at night, the photovoltaic panels of photovoltaic street lamps appear black, making it impossible to quickly identify the photovoltaic panels of photovoltaic street lamps at night.

SUMMARY

According to various embodiments of the present disclosure, a color photovoltaic panel device and a photovoltaic street lamp are provided.

Based on this, it is necessary to provide a color photovoltaic panel device and a photovoltaic street lamp capable of rendering the photovoltaic panel colored at night in view of the problem of poor night recognition of the photovoltaic panel.

The photovoltaic panel device includes a photovoltaic panel, an illumination lamp, a control device and a lamp strap disposed on the photovoltaic panel; the photovoltaic panel is electrically connected to the control device, and when the photovoltaic panel senses light, the photovoltaic panel performs photoelectric conversion and generates a conversion electric signal, so as to output the conversion electric signal to the control device; the control device is electrically connected to the lamp strap, and when the voltage of the conversion electric signal is lower than a preset threshold, the control device generates a driving electric signal, so as to transmit the driving electric signal to the lamp strap; the control device is electrically connected to the illumination lamp, the control device transmits an illumination signal to the illumination lamp for illumination; the lamp strap receives the driving electric signal transmitted by the control device, and emits light of a corresponding color to the photovoltaic panel according to the driving electric signal, and the photovoltaic panel partially absorbs the light of the corresponding color for color presenting.

A photovoltaic street lamp includes a rod body and a photovoltaic panel device described above, which is disposed on the rod body.

In the photovoltaic panel device and the photovoltaic street lamp, the lamp strap is disposed on the photovoltaic panel, the control device transmits the driving electric signal to the lamp strap to drive the lamp strap for emitting light of a corresponding color to the photovoltaic panel. The photovoltaic panel partially absorbs the light of the corresponding color for color presenting, thereby improving recognizability of the photovoltaic panel at night.

The details of one or more embodiments of the disclosure are set forth in the accompanying drawings and the description below. Other features, objects, and advantages of the disclosure will be apparent from the description and drawings, and from the claims.

BRIEF DESCRIPTION OF THE DRAWINGS

To illustrate the technical solutions according to the embodiments of the present disclosure or in the prior art more clearly, the accompanying drawings for describing the embodiments or the prior art are introduced briefly in the following. Apparently, the accompanying drawings in the following description are only some embodiments of the present disclosure, and persons of ordinary skill in the art can derive other drawings from the accompanying drawings without creative efforts.

DETAILED DESCRIPTION OF THE EMBODIMENTS

In order to facilitate understanding of the disclosure, the disclosure will be described more fully below with reference to the accompanying drawings. Preferred embodiments of the present disclosure are shown in the accompanying drawings. However, the present disclosure can be implemented in many different forms and is not limited to the embodiments described herein. On the contrary, it is an object of these embodiments to provide a more thorough understanding of the disclosure of the present disclosure.

It should be noted that when an element is referred to as being "fixed" to another element, it can be directly on the other element or it can also be presence of a central element. When an element is considered to be "connected" to another element, the element can be directly connected to the other element or it can be simultaneous presence of the central element. The terms "vertical", "horizontal", "left", "right" and the like used herein are for illustrative purposes only and are not meant to be the only embodiment.

Figure 1:
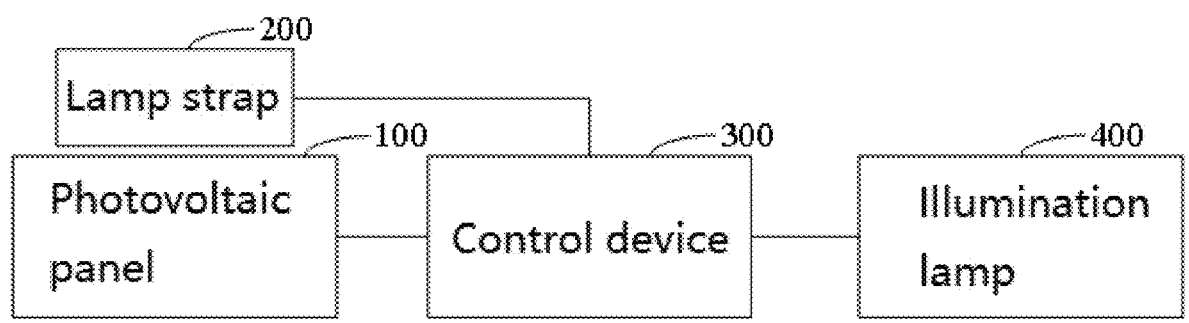
FIG. 1 is a schematic structural diagram of a color photovoltaic panel device according to an embodiment.

In one embodiment, as shown in FIG. 1, a color photovoltaic panel device includes a photovoltaic panel 100, an illumination lamp 400, a control device 300, and a lamp strap 200 disposed on the photovoltaic panel 100. The photovoltaic panel 100 is electrically connected to the control device 300, and when the photovoltaic panel 100 senses light, the photovoltaic panel 100 performs photoelectric conversion and generates a conversion electric signal, so as to output the conversion electric signal to the control device 300. The control device 300 is electrically connected to the lamp strap 200, and when the voltage of the conversion electric signal is lower than a preset threshold, the control device 300 generates a driving electric signal, so as transmit the driving electric signal to the lamp strap 200. The control device 300 is electrically connected to the illumination lamp 400, the control device 300 transmits an illumination signal to the illumination lamp 400 for illumination. The lamp strap 200 receives the driving electric signal transmitted by the control device 300, and emits light of a corresponding color to the photovoltaic panel 100 according to the driving electric signal, and the photovoltaic panel 100 partially absorbs the light of the corresponding color for color presenting.

When light (e.g., sunshine) irradiates on the photovoltaic panel 100, the photovoltaic panel 100 generates a corresponding conversion electric signal by photoelectric conversion. It is understood that, magnitude of the conversion electric signal generated by the photovoltaic panel 100 is determined according to light intensities. For example, the conversion electric signal generated by the photovoltaic panel 100 is relatively high at noon with strong light. When the light generated by the illumination lamp 400 irradiates on the photovoltaic panel 100 at night, the conversion electric signal generated by the photovoltaic panel 100 is relatively low. The photovoltaic panel 100 can be equipped with a conventional storage battery or the like. After the photovoltaic panel 100 generates the conversion electric signal, the photovoltaic panel 100 charges the storage battery so as to store electric energy, and then the conversion electric signal is output to the control device 300 through the storage battery. After the conversion electric signal is supplied to the control device 300, the control device 300 can be powered, and the illumination lamp 400 and the lamp strap 200 can also be powered through the control device 300. The control device 300 includes a MCU (Microcontroller Unit) that receives the conversion electric signal and determines the magnitude of the conversion electric signal. For example, when the voltage of the conversion electric signal is lower than 5 V, it is indicated that it is night, and the photovoltaic panel 100 receives light from other external illumination lamp 400 or does not receive light at this time. The preset threshold is 5 V. In other embodiments, the magnitude of the preset threshold can be adjusted according to the actual situation. By setting the preset threshold, the control device 300 can avoid generating the driving electric signal to drive the lamp strap 200 for emitting light when the voltage of the conversion electric signal is greater than the preset threshold. It should be noted that the illumination lamp 400 is capable of illuminating a road, and the illumination lamp 400 may employ a conventional lamp, for example, an incandescent lamp. The driving electric signal transmitted by the control device 300 may be a voltage signal or a current signal that drives the lamp strap 200 for emitting light. After the lamp strap 200 receives the driving electric signal, light of the corresponding color may be emitted, such as, red light, green light or yellow light, and the like. The photovoltaic panel 100 may absorb a part of visible light, for example, light having a wavelength in a range of 400-700 nm may be absorbed. It is understood that after the light having a wavelength in the range of 400-700 nm in the light emitted from the lamp strap 200 is absorbed by the photovoltaic panel 100, the remaining light outside the wavelength range of 400-700 nm cannot be absorbed by the photovoltaic panel 100, such that the photovoltaic panel 100 presents colorful and brilliant colors.

In the photovoltaic panel device and the photovoltaic street lamp, the lamp strap 200 is disposed on the photovoltaic panel 100, and the control device 300 transmits the driving electric signal to the lamp strap 200 to drive the lamp strap 200 for emitting light of the corresponding color to the photovoltaic panel 100. The photovoltaic panel 100 partially absorbs the light of the corresponding color for color presenting, thereby improving recognizability of the photovoltaic panel 100 at night.

Figure 2:
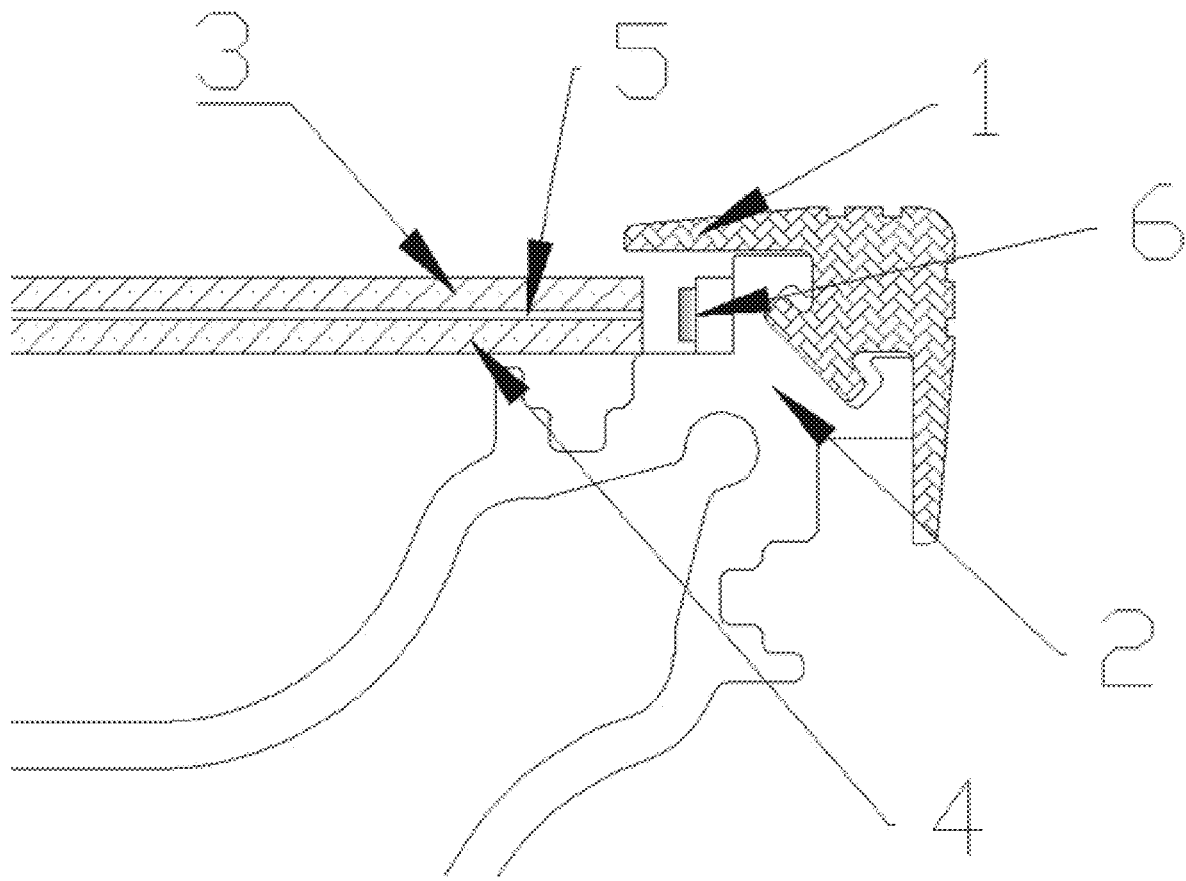
FIG. 2 is a schematic structural diagram of a photovoltaic panel according to an embodiment.

In one embodiment, as shown in FIG. 2, a photovoltaic panel 100 includes an upper glass layer 3, a lower glass layer 4 and a silicon wafer 5. A lamp strap 200 includes a plurality of light emitting units 6 in series. A color photovoltaic panel device further includes a bracket 2 on which the photovoltaic panel 100 is mounted. The light emitting units 6 are disposed on the photovoltaic panel 100 through the bracket 2 and is disposed corresponding to a side wall of the photovoltaic panel 100. The light emitting units 6 are disposed around the side wall of the photovoltaic panel 100 through the bracket 2, so as to avoid affecting the illumination area of the photovoltaic panel 100 because the lamp strap 200 is disposed on the surface of the photovoltaic panel 100, and ensure that the photovoltaic panel 100 can receive the illumination normally for photoelectric conversion.

In one embodiment, as shown in FIG. 2, a photovoltaic panel 100 is made up of a light-transmitting material (i.e., the silicon wafer 3, the lower glass layer 4, and the upper glass layer 5 are all made up of a light-transmitting materials), and the light emitting unit 6 is disposed parallel to the side wall of the photovoltaic panel 100. By using the photovoltaic panel 100 made of the light-transmitting material, light emitted from the light emitting unit 6 parallel to a side wall of the photovoltaic panel 100 can be irradiated into the photovoltaic panel 100, and after light is refracted and reflected by the photovoltaic panel 100, the photovoltaic panel 100 absorbs a part of the light, and the remaining light cannot be absorbed, such that the photovoltaic panel 100 presents colorful and brilliant colors, which effectively improves recognizability of the photovoltaic panel 100 at night.

In one embodiment, as shown in FIG. 2, the color photovoltaic panel device further includes a light-shielding fixing plug-in 1 disposed on the bracket 2 and projection of the light-shielding fixing plug-in 1 onto the bracket 2 covers the light emitting unit 6. By providing the light-shielding fixing plug-in 1, the photovoltaic panel 100 can be fixed on the bracket 2. Light emitted from the light-emitting unit 6 can be effectively shielded by the light-shielding fixing plug-in 1, such that the light emitted from the light emitting unit 6 can only be irradiated on the side wall of the photovoltaic panel 100, so as to prevent the light emitted from the light emitting unit 6 from being confused, and further improve recognizability of the photovoltaic panel 100 at night.

In one embodiment, as shown in FIG. 2, a color photovoltaic panel device includes a light-shielding fixing plug-in 1, a bracket 2, a photovoltaic panel 100 and a light emitting unit 6. The photovoltaic panel 100 includes a silicon wafer 3, a lower glass layer 4 and an upper glass lay 5. The light emitting unit 6 is parallel to a side wall of the photovoltaic panel 100, and the light emitting unit 6 is spaced from the side wall of the photovoltaic panel 100. The space distance can be adjusted according to actual conditions, for example, a suitable space distance can be selected according to light intensity of the light emitting unit 6. The light-shielding fixing plug-in 1 can serve to fix the photovoltaic panel 100. When the light emitting unit 6 emits light, the light-shielding fixing plug-in 1 can shield the light emitted from the light emitting unit 6 upward, such that the light emitted by the light emitting unit 6 can only be irradiated onto the side wall of the photovoltaic panel 100 and transmitted and refracted in the lower glass layer 4 and the upper glass layer 5. After the photovoltaic panel 100 partially absorbs the light, the remaining light that cannot be absorbed by the photovoltaic panel 100 can cause the photovoltaic panel 100 to present colorful and brilliant colors. Further, the light emitting unit 6 may be an LED light bar emitting light with different colors or an LED light bar emitting light with a single color (for example, emitting only red light, only yellow light or only green light), that is, the light emitting unit 6 includes a plurality of LED lights, and every LED light may emit light of a corresponding color. Since the body of the photovoltaic panel 100 is generally blue, when the light emitted from the LED light is transmitted and refracted in the lower glass layer 4 and the upper glass layer 5, the body of the photovoltaic panel absorbs a part of the light, and the remaining light cannot be absorbed, such that the photovoltaic panel 100 finally presents colorful and brilliant colors, which effectively improves recognizability of the photovoltaic panel 100 at night.

Figure 3:
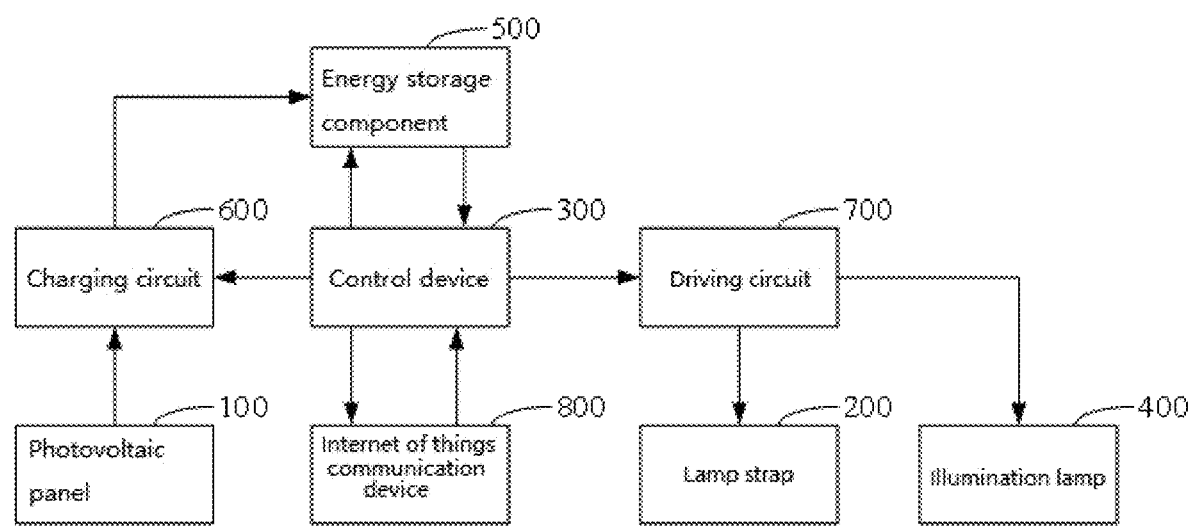
FIG. 3 is a schematic structural diagram of the color photovoltaic panel device according to another embodiment.

In one embodiment, as shown in FIG. 3, a color photovoltaic panel device further includes an energy storage component 500 through which a photovoltaic panel 100 is electrically connected to a control device 300. The energy storage component 500 includes a super capacitor for storing electric energy, and the photovoltaic panel 100 may output the converted electric energy to the energy storage component 500 for storage after receiving illumination and performing photoelectric conversion. The stored electric energy is then output to the control device 300 via the energy storage component 500 for powering the control device 300, an illumination lamp 400, a lamp strap 200, and the like. In other embodiment, the energy storage component 500 includes a lead-acid battery or the like, In one embodiment, as shown in FIG. 3, a color photovoltaic panel device further includes a charging circuit 600 through which a photovoltaic panel 100 is electrically connected to an energy storage component 500, and a control device 300 is connected to the charging circuit 600. The charging circuit 600 includes a rectifying circuit, a voltage stabilizing circuit and a filtering circuit connected in sequence. The photovoltaic panel 100 is connected to the rectifying circuit, and the control device 300 is connected to the filtering circuit. The rectifier circuit includes a rectifier bridge and the like for converting input alternating current (AC) into direct current (DC), and the voltage stabilizing circuit includes a conventional voltage stabilizing chip for stabilizing the DC power output from the rectifier bridge, and the filter circuit includes a resistor-capacitor filter circuit for filtering the DC after stabilized by the voltage stabilizing chip, and filtered DC is finally used for charging the energy storage component 500. By providing the charging circuit 600, the voltage output from the photovoltaic panel 100 after the photoelectric conversion can be stabilized, and the safety of the energy storage component 500 in charging can be ensured.

In one embodiment, as shown in FIG. 3, a color photovoltaic panel device further includes a driving circuit 700 through which a control device 300 is electrically connected to a lamp strap 200. The driving circuit 700 includes a driving chip, and the control device 300 controls the lamp strap 200 to emit light by transmitting a driving electric signal to the driving chip, which outputs a corresponding driving voltage to the lamp strap 200 according to the driving electric signal. For example, when the LED light in the lamp strap 200 needs to emit light of different colors, the driving chip changes the driving voltage output to the lamp strap 200 according to the driving electric signal to realize that the LED light emits the light of different colors. By driving the lamp strap 200 to emit light via the driving circuit 700, the stability and reliability of light-emitting of the lamp strap 200 can be ensured, and light-emitting of the lamp strap 200 can be easily controlled.

Further, in one embodiment, as shown in FIG. 3, an illumination lamp 400 is electrically connected to a control device 300 through a driving circuit 700. The illumination lamp 400 is connected to a driving chip in the driving circuit 700, and then the driving chip outputs a voltage of a corresponding value to the illumination lamp 400 according to an illumination signal transmitted from the control device 300, such that the illumination lamp 400 performs illumination. The illumination lamp 400 is electrically connected to the control device 300 through the driving circuit 700, thereby facilitating the control device 300 to control the illumination lamp 400 to illuminate a road.

In one embodiment, as shown in FIG. 3, a color photovoltaic panel device further includes an Internet of Things communication device 800 which is electrically connected to a control device 300. The Internet of Things communication device 800 includes a 4G wireless communication device and a Wi-Fi wireless communication device. The control device 300 is capable of performing data communication with a remote operation and maintenance platform through the Internet of Things communication device 800, which is convenient for the remote operation and maintenance platform to monitor a lamp strap 200 and an illumination lamp 400.

Figure 4:
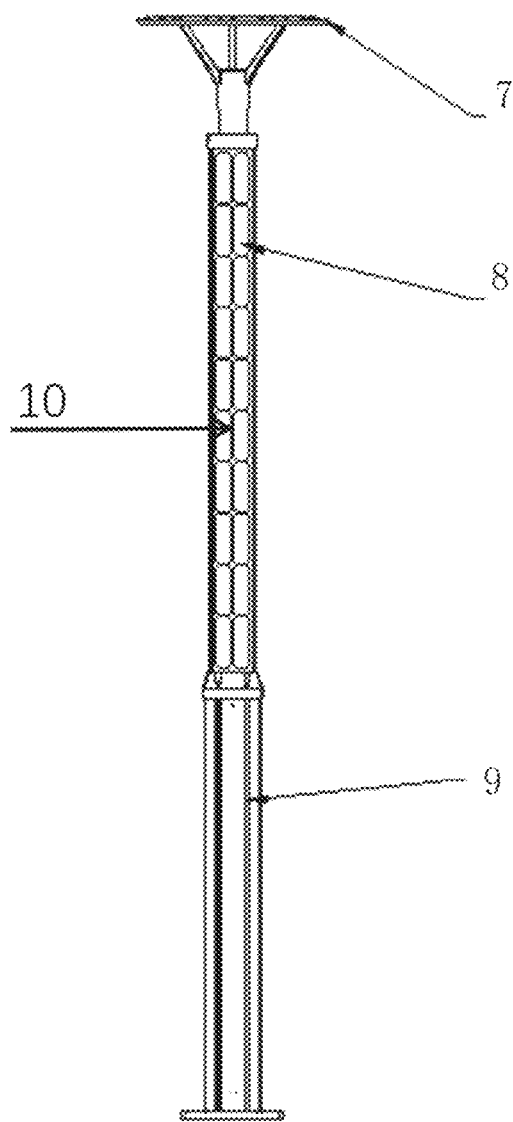
FIG. 4 is a schematic structural diagram of a photovoltaic street lamp according to an embodiment.

In one embodiment, as shown in FIG. 4, a photovoltaic street lamp includes a rod body 9 and a color photovoltaic panel device described above. A photovoltaic panel 100 in the color photovoltaic panel device includes a plurality of photovoltaic units 8. An illumination lamp 400 in the color photovoltaic panel device includes a street lamp 7, and each photovoltaic unit 8 is disposed on the rod body 9. The street lamp 7 is provided on top of the rod body 9, the plurality of photovoltaic units 8 are fixed to a side of the rod body 9 by a bracket, and a control device 10 in the color photovoltaic panel device is provided inside the rod body 9.

In the photovoltaic street lamp, a lamp strap is disposed on a photovoltaic panel 100, and the control device transmits a driving electric signal to the lamp strap to drive the lamp strap to emit light at night, thereby making the photovoltaic panel 100 reflect and refract the light under the illumination of the lamp strap, which improves recognizability of the photovoltaic panel 100 at night.

Figure 5:
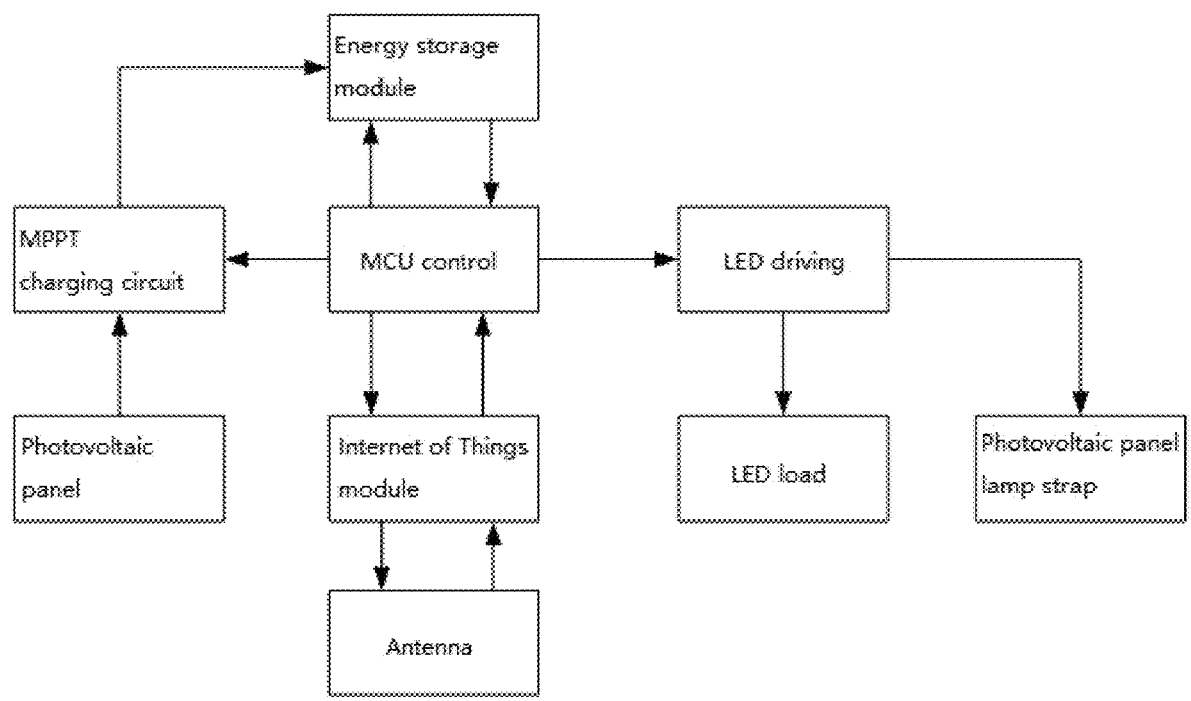
FIG. 5 is a control schematic diagram of the color photovoltaic panel device according to an embodiment.

In one embodiment, in order to fully explain the present disclosure, referring to FIG. 5, a system schematic diagram of a photovoltaic street lamp is shown. A photovoltaic panel 100 charges an energy storage module (i.e., the energy storage component described above) through a MPPT (Maximum Power Point Tracking) charging circuit. Then, the energy storage module outputs the voltage to a LED drive (i.e. the driving circuit described above) and a MCU control (i.e. the control device described above). The MCU control controls the LED drive, such that the energy storage module outputs the voltage to a photovoltaic panel lamp strap and a LED load (i.e., the illumination lamp described above). The MCU control also samples the energy storage module at the same time. For example, the information of electric quantity stored in the energy storage component is collected, and then charging speed of the MPPT charging circuit is controlled, for example, when the electric quantity of the energy storage component sampled by the MCU control is relatively low, the MPPT charging circuit is controlled to rapidly charge the energy storage module with maximum power. Finally, the MCU control will communicate with the Internet of Things module (i.e. the Internet of Things communication device described above), for example, a remote operation and maintenance platform will transmit a status acquisition instruction to the Internet of Things module, and the status acquisition instruction is forward to the MCU control through the Internet of Things module. The MCU control transmits status data of the whole photovoltaic street lamp to the Internet of Things module after receiving the status acquisition instruction. Then, the Internet of Things module packages the status data, which is transmitted to the remote operation and maintenance platform through an antenna, so as to facilitate the staff of the remote operation and maintenance platform for operation and maintenance management.

The various technical features of the above-described embodiments can be arbitrarily combined. For the sake of brevity of description, all possible combinations of the respective technical features in the above-described embodiments have not been described, however, as long as there is no contradiction in the combination of these technical features, it should be deemed to be the scope of the specification.

The above-described embodiments represent only several embodiments of the disclosure. The description of the embodiments is more specific and detailed, but are not therefore to be construed as limiting the scope of the disclosure patent. It should be noted that several modifications and improvements can be made to those of ordinary skill in the art without departing from the inventive concept, all of the modifications and improvements fall within the scope of the disclosure. Therefore, the scope of protection of the disclosure patent shall be subject to the appended claims.

What is claimed is:

1. A color photovoltaic panel device, comprising:
    a photovoltaic panel;
    an illumination lamp;
        a control device; and
    a lamp strap disposed on the photovoltaic panel;
    wherein the photovoltaic panel is electrically connected to the control device, wherein when the photovoltaic panel senses light, the photovoltaic panel performs photoelectric conversion and generates a conversion electric signal, so as to output the conversion electric signal to the control device;
    wherein the control device is electrically connected to the lamp strap, wherein when the voltage of the conversion electric signal is lower than a preset threshold, the control device generates a driving electric signal, so as to transmit the driving electric signal to the lamp strap;
    wherein the control device is electrically connected to the illumination lamp, wherein the control device transmits an illumination signal to the illumination lamp for illumination; and
    wherein the lamp strap receives the driving electric signal transmitted by the control device, and emitting light of a corresponding color to the photovoltaic panel according to the driving electric signal, and the photovoltaic panel partially absorbing the light of the corresponding color for color presenting.

2. The photovoltaic panel device of claim 1, further comprising a bracket on which the photovoltaic panel is mounted, the lamp strap being disposed on the photovoltaic panel through the bracket and being disposed corresponding to a side wall of the photovoltaic panel.

3. The photovoltaic panel device of claim 2, wherein the photovoltaic panel is made up of a light-transmitting material, and the lamp strap being disposed parallel to the side wall of the photovoltaic panel.

4. The photovoltaic panel device of claim 3, further comprising a light-shielding fixing plug-in, the light-shielding fixing plug-in being disposed on the bracket, and projection of the light-shielding fixing plug-in onto the bracket covering the lamp strap.

5. The photovoltaic panel device of claim 1, further comprising an energy storage component through which the photovoltaic panel being electrically connected to the control device.

6. The photovoltaic panel device of claim 5, further comprising a charging circuit through which the photovoltaic panel being electrically connected to the energy storage component, and the control device being connected to the charging circuit.

7. The photovoltaic panel device of claim 1, further comprising a driving circuit through which the control device being electrically connected to the lamp strap.

8. The photovoltaic panel device of claim 7, wherein the illumination lamp is electrically connected to the control device through the driving circuit.

9. The photovoltaic panel device of claim 1, further comprising an Internet of Things communication device electrically connected to the control device.

10. A photovoltaic street lamp, comprising:
    a rod body; and
    a color photovoltaic panel device, wherein the color photovoltaic panel device is disposed on the rod body; and the color photovoltaic panel device comprises a photovoltaic panel, an illumination lamp, a control device and a lamp strap disposed on the photovoltaic panel;
    wherein the photovoltaic panel is electrically connected to the control device, wherein when the photovoltaic panel senses light, the photovoltaic panel performs photoelectric conversion and generates a conversion electric signal, so as to output the conversion electric signal to the control device;
    wherein the control device is electrically connected to the lamp strap, wherein when the voltage of the conversion electric signal is lower than a preset threshold, the control device generates a driving electric signal, so as to transmit the driving electric signal to the lamp strap;
    wherein the control device is electrically connected to the illumination lamp, wherein the control device transmits an illumination signal to the illumination lamp for illumination; and
    wherein the lamp strap receives the driving electric signal transmitted by the control device, and emitting light of a corresponding color to the photovoltaic panel according to the driving electric signal, and the photovoltaic panel partially absorbing the light of the corresponding color for color presenting.

* * * * *